May 27, 1930.  S. C. HOARE  1,760,597
THERMIONIC MEASURING DEVICE
Filed Feb. 15, 1926
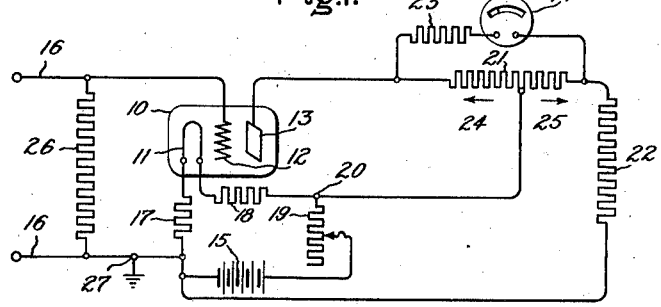
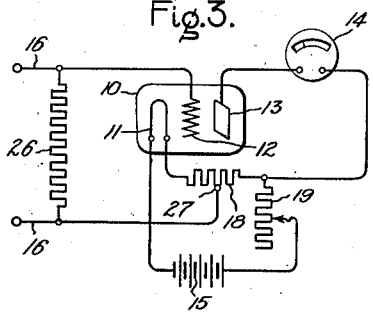
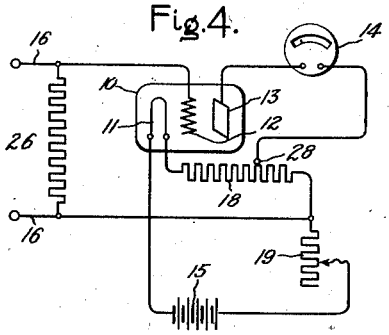
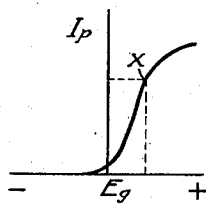
Inventor:
Stephen C. Hoare,
by *Alexander S. Lunt*
His Attorney.

Patented May 27, 1930

1,760,597

UNITED STATES PATENT OFFICE

STEPHEN C. HOARE, OF LYNN, MASSACHUSETTS, ASSIGNOR TO GENERAL ELECTRIC COMPANY, A CORPORATION OF NEW YORK

THERMIONIC MEASURING DEVICE

Application filed February 15, 1926. Serial No. 88,431.

My invention relates to apparatus for accurately measuring small voltages and embodies an improved vacuum tube circuit especially suited for this purpose, but which has novel features suitable for more general application.

The ordinary form of vacuum tube measuring instrument is dependent upon a separate source of plate supply voltage and requires that both the plate and filament voltages be measured. According to my invention I avoid these requirements and provide a simple, easily calibrated, highly sensitive instrument circuit which has other desirable features hereinafter explained.

The features of my invention which are believed to be novel and patentable will be pointed out in the claims appended hereto. Several embodiments of my invention will now be explained in connection with the accompanying drawing which illustrates in Fig. 1 the preferred arrangement, and in Figs. 3 and 4 alternative arrangements of the circuits employed in carrying out my invention, while Fig. 2 is a characteristic curve of the instrument.

The thermionic voltmeter of Fig. 1 comprises essentially a three-electrode tube 10 having a filament 11, a grid 12 and a plate 13, a sensitive measuring instrument 14 associated with the plate circuit of the tube, a single battery 15 for supplying all of the circuits of the instrument, a single rheostat 19 for simultaneously adjusting the filament, grid and plate voltages, the terminals 16 across which the unknown voltage to be measured is connected, and various resistance circuits interconnecting the parts as illustrated. To illustrate one practicable combination, certain values of resistances will hereinafter be specified, but I desire to have it understood that the invention is by no means limited in this respect.

The filament circuit goes from the negative side of the battery, which is preferably grounded at 27, through a low resistance 17 of about 5 ohms, through the filament 11, a low resistance 18 of about 14 ohms, through the adjustable rheostat 19 back to the positive side of the battery. The battery voltage is not important so long as it is sufficient. A six-volt battery will be specified in which case a ten-ohm rheostat at 19 will be suitable. The necessary grid voltage is obtained by the drop across the resistance 17 and the plate voltage is obtained by the drop across the resistance 18 connected in series with the filament. These features constitute an important aspect of my invention because the resistances are so proportioned that the single adjustment of the filament voltage by the resistor 19 also correctly adjusts the grid and plate voltages and constitutes the only adjustment necessary. This feature eliminates troubles due to variations in filament heating, and makes the device a constant current one so that the resistance and voltage of the filament battery are immaterial so long as the rheostat 19 has the proper range of adjustment.

The plate 13 is connected to the point 20 of the filament circuit through a substantial part of a high resistance 21. This resistance may be 5000 ohms and that part between point 20 and the plate may be 4000 ohms. Between the opposite end of this resistance and the negative side of the battery is connected a high resistance 22 of about 30000 ohms constituting a balancing circuit and across the resistance 21 is connected the microammeter 14. Preferably a resistance 23 of say 700 ohms is connected in the microammeter circuit for the purpose of adjusting the full scale value of voltage. The resistance of the microammeter itself may be in the neighborhood of 1150 ohms. This combination gives from 5 to 7 volts for full scale deflection. This voltage range of course may be made anything desired by the use of multipliers. With the arrangement described I provide a differential connection of the direct current instrument 14 such that the current from point 20 divides as illustrated by the arrows 24 and 25. These currents counteract each other and give a zero reading on the instrument 14 when no voltage is applied to the terminals 16 and when the filament voltage is in correct adjustment. With this condition the effects of so-called space current are counteracted and annuled and constitute another important feature of the invention.

The purpose of the resistor 26 connected between the grid 12 and the negative side of the battery is to keep the grid at some predetermined potential with respect to the filament when the unknown voltage is off. The potential given the grid with respect to the filament under this condition is determined by the drop across the resistance 17 which provides a negative bias. The value of this bias depends upon the type of tube used and in some cases no negative bias is required, in which case the resistance 17 is omitted. The resistor 26 may be almost any high value but is generally adjusted to about 10,000 ohms per volt of full scale marking of the instrument 14. It will be noted that the arrangement includes a Wheatstone bridge, one arm of which constitutes the resistance 17 and the vacuum tube. The arm parallel to the tube arm is in resistance 22 and the other two parallel arms are the two sections of the resistance 21. The battery 15 is connected across the supply terminals of the bridge through adjustable resistance 19. As pointed out above, when the filament current is adjusted to its normal predetermined value, the bridge is balanced.

To measure voltages with this instrument it is first adjusted with the unknown voltage off by simply adjusting the rheostat 19 until the instrument 14 reads zero. When this is done the current 24 flowing to the plate is in this case one-quarter of the current 25 flowing through the balancing circuit 22, the resistance 22 balancing the resistance of the tube. With this condition the voltages of the filament, plate and grid are at their correct voltages because of the proper proportioning of the resistances in the filament circuit. Any deviation of these voltages will be evidenced by the movement of the pointer of instrument 14 from zero; for example an increase in filament voltage will upset the proportionality of impedances in the instrument circuit and throw the pointer off zero. Thus all adjustments are made simultaneously by simply adjusting the rheostat 19 until instrument 14 indicates zero with the unknown voltage disconnected from the terminals 16. The unknown voltage is then applied across the terminals 16 and the unknown voltage is read from the instrument 14 which is properly calibrated for this purpose.

Fig. 2 represents the characteristics of the instrument. Here the abscissa $Eg$ represents the grid voltage with respect to the filament and is zero at the point where the vertical line $Ip$ cuts the horizontal line $Eg$. The ordinates $Ip$ represent the plate filament current. Thus the point $x$ on the curve represents about 6 volts and 800 microamperes with the circuits as described in Fig. 1. The straight portion of the curve between the lower and upper knees is of course the most satisfactory range of operation. After a measurement is taken the calibration of the circuits may be instantly checked by removing unknown voltage and noting that the instrument pointer returns to zero.

In Figs. 3 and 4 the parts which correspond to those of Fig. 1 are indicated by like reference characters. In Fig. 3 the grid 12 is given an initial positive potential with respect to the filament by connecting it to the resistance 26 to a point 27 on the resistance 18. With this arrangement the initial adjustment is made by the rheostat 19 and with the unknown voltage off so that the instrument 14 gives a definite deflection near full scale. Then when the unknown voltage is applied the instrument deflection decreases in proportion to the unknown voltage and may be calibrated accordingly. In this case the initial grid potential will be positive but somewhat less than the plate potential.

In Fig. 4 the grid is connected so as to have a higher initial voltage than the plate which is now connected to a point 28 on the resistance 18. This scheme, like that of Fig. 3, is initially adjusted with the unknown voltage off and with a full scale deflection on instrument 14. The characteristics of these arrangements are just the reverse of that shown in Fig. 1; that is, in Fig. 1 the tube is worked upward from the lower knee of the curve shown in Fig. 2 so that increasing the positive grid potential gives an increased deflection, while in the arrangements of Figs. 3 and 4 the tube is worked downward from the upper knee of the curve so that increasing the negative grid potential gives a decreased instrument deflection when the unknown voltage is applied.

All of these arrangements have the important feature that an adjustment for the correct filament current simultaneously adjusts the grid and plate voltages to their correct values which is evidenced by a certain known reading on the instrument 14.

In Figs. 3 and 4 the differential connection of the instrument 14 and the balancing circuit are omitted and the instrument 14 is connected directly in the plate circuit because with these schemes the problem of eliminating the effect of space current for the initial adjustment is not involved.

The arrangement of Fig. 1 is suitable for measuring either direct or alternating currents for the reason that the negative half of an alternating current wave would be suppressed. The arrangement of Fig. 4 is also suitable for either direct or alternating currents because here the positive half wave would be suppressed.

In accordance with the provisions of the patent statutes, I have described the principle of operation of my invention, together with the apparatus which I now consider to represent the best embodiment thereof, but I desire to have it understood that the apparatus shown and described is only illustrative and that the invention may be carried out by other means.

What I claim as new and desire to secure by Letters Patent of the United States is:

1. In combination, an electron discharge device having a filament, grid and plate electrodes, a battery for supplying a heating current to said filament, resistances in series with said filament, connections from said resistances to the grid and plate for respectively impressing negative and positive voltages thereon with respect to the filament, terminals for impressing an unknown voltage on said grid, an indicating instrument associated with the plate circuit of said device for measuring the unknown voltage, said instrument being connected across a resistance which is connected at one end to the plate, at an intermediate point to the plate voltage source, and at the other end to a high resistance circuit going to the negative side of the battery for balancing the resistance of the electron discharge device, the various resistances being so proportioned that with the unknown voltage disconnected and the filament current normal said indicating instrument has a zero deflection.

2. Thermionic voltage measuring apparatus comprising a vacuum tube having filament, grid and plate electrodes, an electric circuit for supplying a heating current to said filament, connections from said grid and plate electrodes to said circuit, resistance sections connected in series with said filament in said circuit between said filament and the respective connections to said grid and plate electrodes for impresing predetermined voltages between said filament and said grid and plate electrodes for a given predetermined filament current, means for adjusting said filament current to said predetermined value, said adjustment constituting the sole calibrating adjustment of said apparatus, terminals for impressing an unknown voltage between said filament and grid, and an electric measuring instrument associated with the grid circuit of said tube in such a way as to give a zero measurement deflection only when said filament current is adjusted to said predetermined value with the unknown voltage off and to give a measurment deflection of said unknown voltage when it is applied.

3. Measuring apparatus comprising a Wheatstone bridge, one arm of which comprises a resistance and a vacuum tube having filament, grid and plate electrodes, a battery connected across the supply terminals of said bridge, said resistance being connected from one end of said filament to the negative supply terminals of said bridge and battery, a circuit containing a resistance connected between the other end of said filament and the positive supply terminal of said bridge, a high resistance connection between the negative supply terminal of said bridge and the grid of said tube for impressing a biasing voltage thereon and an adjustable resistance between the positive supply terminal of said bridge and the corresponding terminal of said battery for adjusting the filament current of said tube to a predetermined normal value determined by a balanced condition of said bridge.

In witness whereof, I have hereunto set my hand this 12th day of February, 1926.

STEPHEN C. HOARE.